Patented Nov. 4, 1952

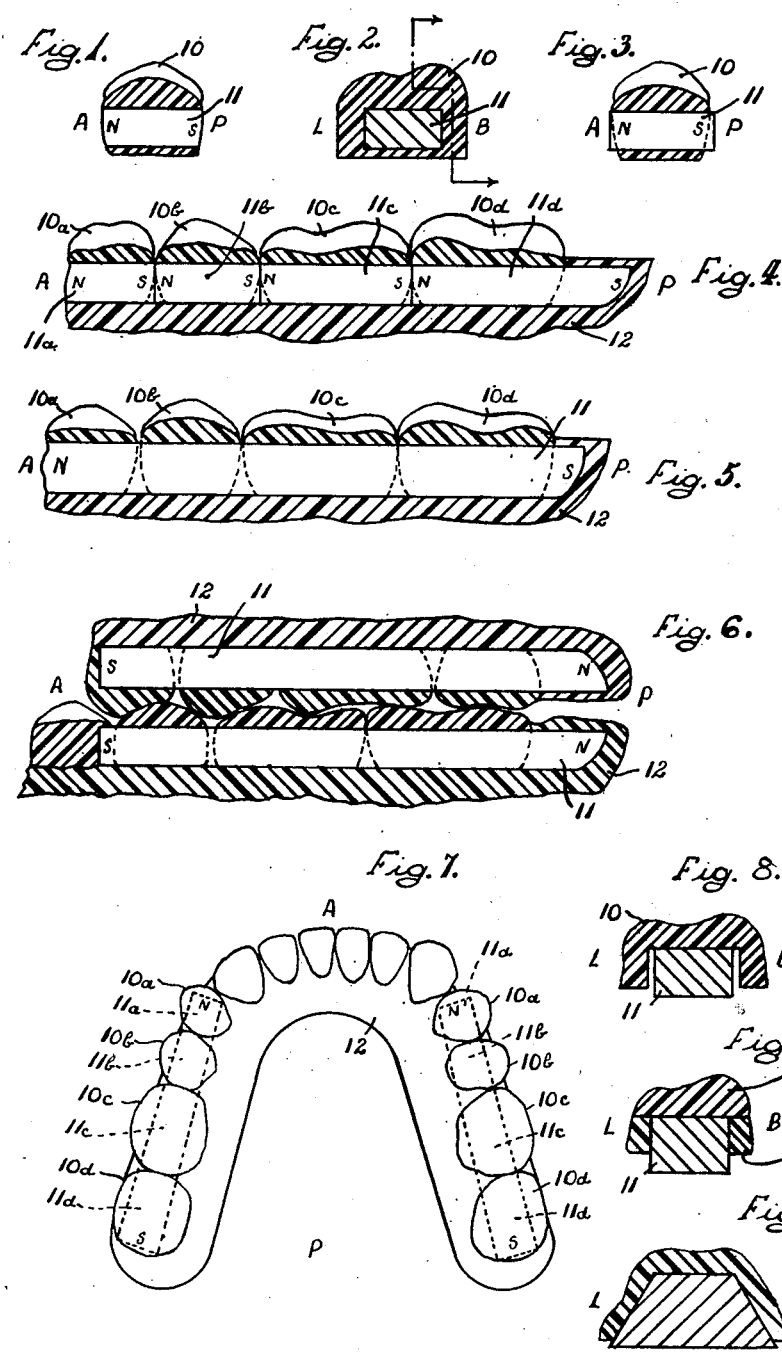

2,616,174

UNITED STATES PATENT OFFICE 2,616,174

DENTURE AND ARTIFICIAL TEETH

Ernest Emil Goldsmith, Johannesburg, South Africa

Application April 18, 1949, Serial No. 88,146
In Great Britain April 19, 1948

7 Claims. (Cl. 32—2)

The present invention relates to artificial teeth and to dentures embodying such teeth.

It is known that the retention of dentures in their correct position in the mouth can be assisted by embodying in the upper and lower dentures permanent magnets polarized in such a way that they repel one another.

The present invention has for its principal object to provide novel combinations of permanent magnets with artificial teeth and dentures, these combinations being of improved convenience in manufacture and efficiency in use.

The invention is illustrated by way of example in the accompanying drawings in which Figures 1 and 2 are views in longitudinal section and in cross section respectively of an artificial tooth according to the invention, the section of Fig. 1 being taken on the line I—I of Fig. 2, Fig. 3 is a view corresponding to that of Fig. 1 of a modified form of artificial tooth according to the invention, Fig. 4 shows in longitudinal section a number of teeth similar to that in Figs. 1 and 2 assembled upon a supporting structure or plate, Fig. 5 is a view corresponding to that of Fig. 4 showing a modification, Fig. 6 is a view in longitudinal section of a part of a set of dentures according to the invention, Fig. 7 is a plan view of one of the dentures in Fig. 6 and Figs. 8 to 10 are views in cross-section of modified forms of artificial teeth according to the invention.

Most of the figures are enlarged views. In all the figures, where applicable, the letters A and P represent the anterior ends respectively and the letters L and B represent the lingual and buccal sides respectively.

In Figs. 1 and 2 there is shown an artificial tooth 10, which may be of acrylic resin or porcelain for example, having a permanent magnet 11 (or permanently-magnetizable material to be magnetized later) traversing the tooth in an anterior-posterior direction. It will be noted that the magnet is wholly surrounded by tooth material excepting on the anterior and posterior surfaces where, when assembled into a denture, it is alongside of another tooth. The magnet is magnetized in the direction AP as indicated by the letters N and S and is preferably of anisotropic material. If preferred the magnet 11 may project slightly on each side of the tooth as shown in Fig. 3.

In Fig. 4 are shown a number of artificial teeth 10a, 10b, 10c and 10d having magnets 11a, 11b, 11c and 11d respectively magnetized in the same direction, passing transversely through them, the adjacent magnet faces being in good contact with one another. The magnets are thus in the form of a chain and constitute together effectively a single magnet. The teeth are molded into a support or plate 12 and it is preferably arranged that the plate material encloses the junction between adjacent teeth in such a manner that the magnets are wholly enclosed by the teeth and the plate material and so protected from acids in the mouth and from risk of contact with other magnets or magnetic material, which contact might cause some degree of demagnetization. As shown in Fig. 4, the under surfaces of the magnets are not enveloped by the tooth material as shown in Figs. 1 to 3, but are protected by the material of the plate.

Where necessary the adjacent magnet surfaces may be made other than perpendicular to the axes of the magnets in order to secure good contact between these surfaces.

It is usually convenient to provide each artificial tooth with a separate magnet as described since such teeth can be supplied to a dental mechanic for assembly into dentures and the mechanic can treat such teeth in the same manner as normal artificial teeth excepting that he should take care to locate adjacent magnet surfaces in good contact with one another. Fillets of magnetic material of wedge or other shape may if necessary be inserted between adjacent magnet faces to ensure good magnetic contact. As shown in Fig. 5, however, the chain of magnets 11a, 11b, 11c, 11d of Fig. 4 may be replaced by a single magnet 11 extending through the premolars 10a and 10b and the molars 10c and 10d.

In Fig. 6 is shown a part of a set of dentures constructed in the manner described with reference to Fig. 5, the upper and lower dentures being shown in approximately their normal relation when in the mouth. One of the dentures in which a chain of magnets is used is shown in plan view in Fig. 7. It will be noted that in Figs. 4 to 6 the magnets are arranged to protrude in a posterior direction some distance beyond the posterior molar 10d, the protruding ends being completely enclosed in the material of the plate 12.

Magnetization should preferably be carried out either in the waxed stage of the preparation of the denture or after completion of the manufacture of the denture. It is preferred to provide either only the molars or the molars and the premolars with permanently magnetizable bodies as described; magnetization is then preferably effected in an anterior-posterior direction, so that anterior zones of the aggregates in both dentures have one polarity, say north, the posterior zones of the magnets in both dentures another polarity, say south. If desired, other artificial teeth, such as canines and incisors, may also be provided with magnets, or where single magnets are used instead of a chain of magnets, the single magnets may be suitably curved to extend through the desired teeth. Magnetization is then carried out longitudinally of the magnet or chain of magnets and thus in a curve following approximately the line of the ridges in the mouth on which the dentures are seated.

The permanently magnetizable bodies may be immovably fixed in the tooth material or they may be loose in their spaces in the teeth so as to enable them to move into close contact with each other and into good register with those of the neighboring teeth in the same denture under the influence of the forces of magnetization. This is illustrated in Fig. 8 and a similar loose arrangement of the magnet may be used when the tooth material completely surrounds the sides of the magnet as shown in Figs. 1 to 3.

One advantage of the arrangements according to the invention over known arrangements is the possibility of using magnet structures having a large ratio of length to cross-section, and therefore structures which can operate at high efficiency in repulsion, and at the same time bringing the magnets in the upper and lower dentures which repel one another much closer together than is the case with known arrangements. The magnetic forces for a given weight of magnetic material are therefore considerably greater than with known arrangements. It is desirable that the magnets should be situated as close as is reasonably practical to the biting surfaces of the teeth.

The permanently magnetizable material 11 is preferably a high coercive, high remanent density material of large energy content $(BH)_{max}$. The polar zones of the bars or in the chain of magnets may be made of a different magnetic material from that of the neutral zone. The polar zones may be made of high-coercive force material, while the neutral zone may be made of high remanent flux density material. The effect is an increased yield of external magnetic energy from a given volume of material.

In all magnetic dentures, good register of the magnets in the lower denture with respect to those of the upper denture is desirable and particularly equal overall length of opposing bars or chains. It is, however, sometimes desired to effect a thrust on the lower denture in a posterior direction. This can be done by mounting the bars or the chains in the upper denture slightly displaced in an anterior direction with respect to the corresponding bars or chains of the lower denture.

The material of the teeth situated between permanent magnet and biting surface may be different from the material of the other regions of the teeth or molar blocks. It may be separately mounted after magnets and side portions of the teeth have been brought into position in the process of manufacture of the denture. This is illustrated in Fig. 9 where the part 13 of the tooth between the magnet 11 and the biting surface is of a hard material such as porcelain and the sides 14 are of softer material such as acrylic resin.

The cross section of the bars or of the magnets of the chain in a plane at right angles to the anterior-posterior direction may have any suitable shape. It may be square, rectangular, elliptic or circular or it may have an irregular shape to follow more or less the outline of the tooth. In Fig. 10 the magnet is of trapezoidal cross-section.

The length to cross-section ratio of the bar magnet or the chain of magnets should be such that (also allowing for the demagnetizing influence of the opposing magnet in the other denture), the material is utilized as closely as possible to its $(BH)_{max}$, the optimum working point. The ratio of the length of the magnet or chain to the equivalent diameter thereof (that is the diameter of a circle of the same area) should be of the order of 5 but there is an optimum value for each type of material.

The magnets may be provided with a special coating, for example of white paint, to prevent the magnets from making the teeth appear gray.

I claim:

1. A set of dentures comprising upper and lower dentures each such denture comprising a plurality of artificial teeth each apertured in a direction generally parallel to its biting surface, supporting means for said teeth and permanent bar magnets extending through said apertures, all of said magnets being magnetized in an anterior-posterior direction at least some of said bar magnets of each denture being maintained in magnetic end to end contact with one another and being wholly surrounded by the artificial tooth material excepting on those anterior and posterior surfaces where said bar magnets establish coacting magnetic adhesive contact with each other.

2. A set of dentures as set forth in claim 1 in which said apertures and said bar magnets have their major width extending laterally of the dentures and their minor width extending coincidentally with the direction of the depth of the dentures.

3. A dental structure consisting of a plurality of artificial teeth, said structure carrying a plurality of artificial teeth each having openings constituting a substantial portion of the cross section of the material of the teeth extending in a direction generally parallel to the biting surface thereof and permanent magnet material disposed in said openings and having a surface situated in proximity beneath the biting surfaces of the teeth and providing a relatively large cross section of magnetic material as compared with the balance of the section of the artificial teeth, said permanent magnet material comprising a plurality of bars disposed in end-to-end contact with one another.

4. An article of manufacture comprising artificial tooth structure including an artificial tooth possessing an opening in a direction generally parallel to its biting surface and which extends immediately below the biting surface and permanent magnet material disposed in the opening and having a surface situated in proximity beneath the biting surface of the teeth, the oppostie end surfaces of the permanent magnet material being exposed at the sides of the tooth.

5. A denture comprising supporting structures, said structure carrying upper and lower sets of artificial teeth each having openings extending to the base of the sets of teeth constituting a substantial portion of the cross section of the material of the teeth extending in a direction generally parallel to the biting surface thereof and permanent magnet material disposed in said openings substantially wholly within the sets of teeth and having a substantially flat surface situated in proximity beneath the biting surfaces of the sets of teeth and providing a relatively large cross section of magnetic material as compared with the balance of each section of the artificial teeth for presenting in coacting relation during the articulation thereof substantially flat linear magnetic surfaces symmetrical one with respect to the other and substantially parallel throughout their length immediately below the biting surfaces of the sets of teeth.

6. A denture as set forth in claim 5 in which said artificial teeth comprise both molars and premolars and wherein said permanent magnet material extends through both said molars and premolars.

7. A dental structure consisting of upper and lower dentures, each denture including a plurality of artificial teeth, said artificial teeth each having openings extending to the base of the teeth constituting a substantial portion of the cross section of the material of the teeth extending in a direction generally parallel to the biting surface thereof and permanent magnet material disposed in said openings substantially wholly within the artificial teeth and having a surface situated beneath the biting surfaces of the teeth and providing a relatively large cross section of magnetic material as compared with the balance of the section of the artificial teeth, said permanent magnet material comprising a single substantially linear bar having a north pole at one end and a south pole at the other end, said poles being disposed on axes which are substantially coplanar with the linear surface of the bar, the substantially linear bar which extends through the teeth of one denture being presented in coextensive substantially parallel relation to the linear bar in the coacting denture.

ERNEST EMIL GOLDSMITH.

REFERENCES CITED

The following references are of record in the file of this patent:

UNITED STATES PATENTS

| Number | Name | Date |
|---|---|---|
| 601,703 | Chaffin | Apr. 5, 1898 |
| 2,096,515 | Hiltebrandt | Oct. 19, 1937 |
| 2,149,048 | Freedman | Feb. 28, 1939 |
| 2,491,581 | Reichner | Dec. 20, 1949 |